No. 768,550. PATENTED AUG. 23, 1904.
E. WAGNER.
PROCESS OF PASTEURIZING BEER.
APPLICATION FILED JUNE 2, 1900.

NO MODEL.

WITNESSES:

INVENTOR:
Edward Wagner
BY Hugh N. Wagner
His ATTORNEY.

No. 768,550.                                             Patented August 23, 1904.

UNITED STATES PATENT OFFICE.

EDWARD WAGNER, OF ST. LOUIS, MISSOURI, ASSIGNOR TO THE MODEL BOTTLING MACHINERY COMPANY, OF ST. LOUIS, MISSOURI, A CORPORATION OF MISSOURI.

PROCESS OF PASTEURIZING BEER.

SPECIFICATION forming part of Letters Patent No. 768,550, dated August 23, 1904.

Original application filed June 30, 1899, Serial No. 722,439. Divided and this application filed June 2, 1900. Serial No. 18,812. (No specimens.)

*To all whom it may concern:*

Be it known that I, EDWARD WAGNER, a citizen of the United States, and a resident of the city of St. Louis, State of Missouri, (whose post-office address is St. Louis, Missouri,) have invented certain new and useful Improvements in Processes of Pasteurizing Beer, of which the following is a full, clear, and exact specification, this application being a division of one filed by me in the United States Patent Office June 30, 1899, Serial No. 722,439, in which the apparatus for practicing this process is fully described.

This invention relates to an improved process for pasteurizing beer, the object being to destroy the yeast molecules and germs contained in the beer in order to prevent further fermentation in a simple, cheap, and convenient manner.

For the sake of convenience in describing this process a drawing is filed herewith, it being understood, of course, that I do not limit myself to this form of apparatus for the practice of my improved process, but that the essential characteristics of said process are set forth in the claims.

Figure 1:
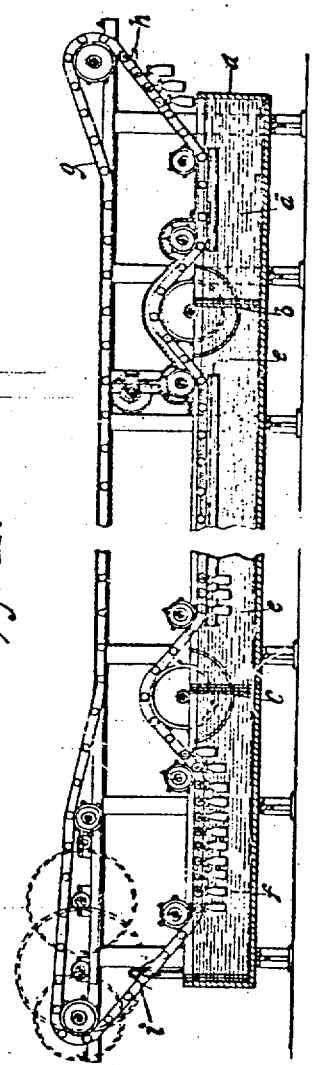
Figure 2:
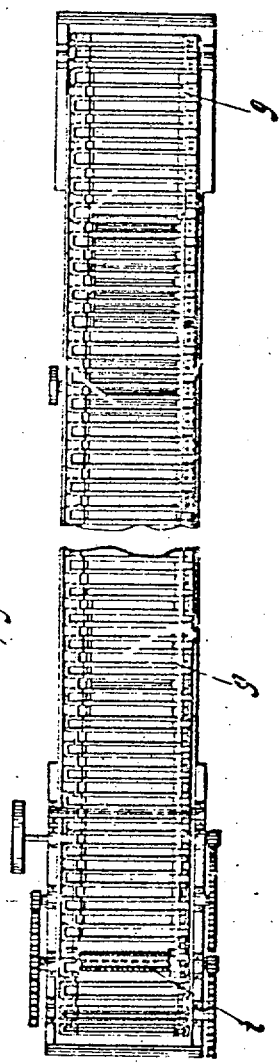

In the drawings, Figure 1 is a longitudinal vertical sectional view through said apparatus; and Fig. 2 is a top plan view, partly broken away, to show in section the spray-pipe $i$.

$a$ indicates a tank made, preferably, of sheet metal and divided by partition-walls $b$ and $c$ into compartments $d$, $e$, and $f$. Suitable supply and overflow pipes (not shown) are arranged at convenient points in the several compartments, and in practice the compartment $d$, which is at the front end of the apparatus, is designed to receive warm water, the compartment $e$ hot water, and the compartment $f$ cold water.

An endless chain $g$, carrying bottle-supports $h$ in rows, as described in my above-mentioned application for patent for apparatus to carry out this process, in which the bottles containing the beer to be treated are carried, is caused to travel in a serpentine path into and out of the waters of different temperatures from the front end of the apparatus to the rear end. An attendant places the bottles containing the beer in their supports, and another attendant, at the rear end of the machine, receives the bottles after their contents have been treated and removes them from the apparatus.

In carrying out my improved process the bottles containing the beer to be treated are corked, as usual, and placed in their supports, whereby the bottles are first dipped in the compartment containing the warm water. While submerged they are caused to travel continuously for such time as is necessary to initially raise the temperature of the beer, after which the bottles pass to the next compartment, in which is contained the hot water. In this compartment the bottles are submerged and caused to travel continuously for quite a long time—say fifty minutes—until the pasteurizing process is completed, when the bottles are subjected to cooling influences, such as the atmosphere or a spray of water, whereby the beer is partly relieved of its great heat and its temperature partially reduced in readiness for the final lukewarm bath in the last compartment, after which it is subjected to a final spray of cold water.

It is obvious that sprays of water of the proper temperature, as above described, might at one or more points of the apparatus above referred to be substituted for the corresponding bath and that such change would not depart from the nature and principle of my invention, although in practice it would be found to a large extent less satisfactory than the successive baths of different temperatures hereinabove described.

Heretofore the process of pasteurizing beer has been to place the bottles in the bottom of a tank into which was admitted water at atmospheric temperature. Hot water was then admitted, and the cold water escaped through overflow-pipes provided for that purpose. The admission of the hot water being usually at one point of the tank made its distribution uneven, with the result that currents of hot and cold water would alternately strike the bottles, and it required the continued admission of hot water for a long period of time to secure a uniform heat throughout the tank. Not only this, but the natural tendency of the cold water to settle in the bottom of the tank around the bottles and the hot water to rise retarded the removal of the cold water, and this stratification of the waters at different temperatures was rendered doubly difficult to overcome on account of the protection offered the colder water by the bottles themselves, which obstructed the flow of the hot water and rendered the cold water inaccessible, thus preventing the commingling of the two.

When the pasteurizing process with the above-described uncertainties was completed, the water of the tank was withdrawn and cold water admitted with little or no preparation for its reception, which frequently resulted in the bottles being broken by reason of the too sudden change in temperature in the waters. When the bottles were cool, they were then taken from the tank by hand in the same manner as they had been thereinto introduced.

Another method sometimes practiced is to place the bottles in a tank provided with steam-coils, in which the tank is filled with water and the steam turned into the coils, resulting in a gradual increase in temperature of the water, after which when the pasteurization is completed the steam is turned off and cold water again introduced. This process, like the one just described, is objectionable in that the water being quiet will stratify and there will be a large waste in cooling the bottles, and the cost is likewise great on account of the quantity of steam employed for heating a single charge. Moreover, the time consumed is out of proportion to the benefits gained under the system first described.

My present process contemplates the initial preparation of the bottled beer by warming, after which it is introduced into a tank wherein the water is uniformly hot and then gradually reducing the temperature of the beer by means of a lukewarm bath or equivalent step of the process preparatory to the beer being brought to atmospheric temperature by the spray-pipe $j$ throwing a jet or spray of cold water upon the beer.

In practice the warm-water bath is about 120° Fahrenheit, and the bottles containing the beer to be pasteurized remain therein about ten minutes. The hot-water bath is about 145° Fahrenheit, and the bottles remain in this hot bath for about fifty minutes. After leaving the hot bath the bottles are exposed to the atmosphere or the atmosphere and cooling-sprays for about five minutes and finally are treated to a relatively cold bath at 100° Fahrenheit for about twenty minutes.

Having thus described my invention, what I claim, and desire to secure by Letters Patent, is—

1. The improved method of pasteurizing beer consisting in continuously moving the receptacles containing the beer through a pasteurizing agent.

2. The improved method of pasteurizing beer consisting in continuously moving the receptacles containing the beer at a uniform speed through a pasteurizing agent.

3. The improved method of pasteurizing beer consisting in continuously moving the receptacles containing the beer through a preparatory heating medium; then continuously moving the same through a warming-chamber; then continuously moving the same through a pasteurizing agent; and then gradually cooling the same.

4. The improved method of pasteurizing beer consisting in continuously moving the receptacles containing the beer through a pasteurizing agent and then reducing the temperature thereof by cooling-currents falling thereon.

5. The improved method of pasteurizing beer consisting in continuously moving the receptacles containing the beer through a pasteurizing agent, and then reducing the temperature thereof by means of cooling-sprays.

6. The herein-described process of pasteurizing beer consisting of continuously moving the receptacles containing the beer through a warming medium; then continuously moving said receptacles through a pasteurizing agent; and then continuously moving said receptacles through cooling media.

In testimony whereof I have hereunto affixed my signature, in the presence of two witnesses, this 18th day of May, 1900.

EDWARD WAGNER.

Witnesses:
HUGH K. WAGNER,
A. E. WAGNER.